US006573492B2

(12) United States Patent
Nagai

(10) Patent No.: US 6,573,492 B2
(45) Date of Patent: Jun. 3, 2003

(54) MASS SPECTROMETRIC ANALYSIS METHOD AND APPARATUS USING THE METHOD

(75) Inventor: Shinji Nagai, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 219 days.

(21) Appl. No.: 09/748,330

(22) Filed: Dec. 26, 2000

(65) Prior Publication Data

US 2001/0007349 A1 Jul. 12, 2001

(30) Foreign Application Priority Data

Dec. 27, 1999 (JP) .......................................... 11-371361

(51) Int. Cl.[7] .......................... H01J 49/00; B01D 59/44

(52) U.S. Cl. ........................ 250/282; 250/281; 250/283; 250/292; 73/23.22

(58) Field of Search ................................ 250/282, 281, 250/283, 292; 73/23.22

(56) References Cited

U.S. PATENT DOCUMENTS 4,353,242 A * 10/1982 Harris et al. ............... 73/23.36
6,011,259 A * 1/2000 Whitehouse et al. ....... 250/287
6,147,344 A * 11/2000 Annis et al. ................ 250/281

FOREIGN PATENT DOCUMENTS

JP 10-142196 5/1998

* cited by examiner

*Primary Examiner*—John R. Lee
*Assistant Examiner*—Nikita Wells
(74) *Attorney, Agent, or Firm*—Kenyon & Kenyon

(57) ABSTRACT

In a spectrometric analysis method and an apparatus implementing the method, a data base storing spectral data sets of respective standard substances, which are obtained by analyzing these standard substances in advance, each spectral data set including a name of a substance, its $MS^1$ spectral data and $MS^2$ spectral data, is constructed; and $MS^2$ spectral data sets obtained by $MS^2$ analysis of a sample are compared with $MS^2$ analysis spectral data sets stored in the data base.

12 Claims, 9 Drawing Sheets

ANALYSIS CONDITION-SETTING SCREEN

ANALYSIS CONDITION-SETTING SCREEN

MASS SPECTROMETRIC ANALYSIS METHOD AND APPARATUS USING THE METHOD

BACKGROUND OF THE INVENTION

The present invention relates to a mass spectrometer including an ion trap, and a mass spectrometric analysis method performed in the mass spectrometer.

A mass spectrometer is an analytical instrument which charges sampled molecules of a measured object, and measures the mass number to electrical charge ratio of the generated ions, and an ion current, as mass spectral data. Since a substance possesses a specific molecular mass related to the kinds and number of atoms composing the substance, by obtaining the mass spectral data of the substance, it is possible to obtain important information to specify the substance. Further, since a mass spectrometer can be directly connected to a chromatography apparatus such as a gas or liquid chromatograph measurement device, a capillary electrophoresis chromatograph measurement device, and so forth, it can be used as a detector of high sensitivity, which is capable of obtaining various kinds of qualitative information, for a chromatography apparatus.

Recently, concern for environmental problems, health of a human body, etc. has grown, and a chromatograph direct-coupled type mass spectrometer has been used in various fields such as in checking for harmful organic compounds included in clean water, waste water, foods, etc., assessing the safety of a developed new drug, and so forth. Requirements for such an analytical instrument are as follows.

(1) It has a high sensitivity, and can perform a quantitative analysis with the analytical instrument.

(2) It is possible to obtain qualitative information enough to specify a substance certainly.

(3) It can remarkably reduce the work for a sample preparation, which is necessary in the measurement of a sample, to remove impurities which are not to be analyzed.

(4) Since a pesticide to be analyzed includes ten to sixty components, the analytical instrument is required simultaneously to analyze as many substances as possible by a single sample injection.

Specifically, in order to achieve the requirement (2), mass spectral data of standard substances are measured and stored in advance. On the other hand, a mass spectrum of the substance corresponding to each peak which has appeared in a chromatograph of a sample, is obtained, and a standard substance which has a mass spectrum coinciding with the measured mass spectrum corresponding to each in the chromatograph of the sample, is searched. Further, it is determined that if there are substances which have the mass spectra highly coinciding with the measured spectra of the peak substances in the chromatograph of the sample, respectively, the sample includes these substances.

In comparison to examine the coincidence between mass spectra of standard substances and those of respective peak substances in a sample, it frequently occurs that mass spectra of peak impurity substances included in the sample are measured, the impurity substances being not includes in the standard substances, and this causes deterioration of the measurement accuracy in the comparison results. If an atmospheric-pressure ionization method is used for ionizing a sample to be analyzed by a mass spectrometer, the obtained mass spectrum is generally a simple spectrum in which the peak corresponding to the molecular number of a sample has the highest intensity. Although the feature of the atmospheric-pressure ionization method is effective to confirm the molecular number of a sample, since there is generally a smaller number of peaks due to bond-cleavage ions in a mass spectrum obtained by using this ionization method in comparison with that obtained by using an electron impact ionization method, the mass spectrum obtained by using the atmospheric-pressure ionization method gives poor information to identify a sample, in the case where the identification of the sample is performed by comparing measured mass spectra of the sample with those of standard substances. Generally, the atmospheric-pressure ionization method is used for an ionization chamber connected to a liquid chromatograph, that is, an LC (Liquid Chromatograph)/MC (mass spectrograph) system, and the electron impact method is used for an ionization chamber connected to a gas chromatograph, that is, GC (Gas Chromatograph)/MC (mass spectrograph) system. Here, in the LC/MC system, after obtaining a mass spectrum for a definite range of mass only, it is very difficult to specify components of a sample.

To solve the above problem, what has been performed is, components of a sample are identified by specifying a representative mass number of each component of the sample and performing $MS^n$ analysis with regard to ions of the mass number, in order to increase spectral information on the sample.

In Japanese Patent Application Laid-Open Hei. 10-142196, it is disclosed that $MS^1$ analysis and $MS^n$ analysis are carried out in succession.

In the $MS^n$ analysis, ions of a specified mass number in ions, which have been introduced into a mass spectrograph, are selected. Then, energy is given to these selected ions by making them collide with neutral particles, and they are cleaved. Further, respective groups of the cleaved ions are sent to a detector in order of the mass number of the groups, and mass spectral data of each group of ions is obtained. Mass spectral data obtained by sending ions, which have been introduced into the mass spectrograph, to the detector without causing any reaction in these ions, is called simply MS spectral data, or $MS^1$ spectral data. On the other hand, mass spectral data of the above cleaved ions which have received the cleavage reaction of one stage, is called $MS^n$ spectral data. Moreover, by sending the selected ions to the detector after causing cleavage reactions in the selected ions, which have been introduced into the mass spectrograph, in multiple stages, data of $MS^3$, $MS^4$, or $MS^5$, can be obtained. Since there is a portion in a molecule in which a cleavage easily occurs due to the structure of the molecule, even if the molecular number of a sample is equal to that of another sample, it is possible to distinguish samples of the same molecular number by comparing the respective spectral data of ions of the samples of different structures, which have received the cleavage reactions of multiple stages. Therefore, even if spectral information enough to specify a sample cannot be obtained by using usual MS data, the sample can be identified by using $MS^n$ data. Further, since the specific kind of ions are selected and cleaved, and $MS^2$ spectrum of the cleaved ions is obtained, the peaks existing in the spectral data, which are caused by impurities, can be excluded.

Although the above $MS^n$ analysis is excellent with regard to exclusion of influences due to impurities, and improvement of accuracy in substance-specification, it is necessary to specify the mass number of target ions to be cleaved, in advance, in order to perform the $MS^n$ analysis. If the analysis concerning a known substance is performed, it is easy to specify the mass number of target ions to be cleaved. However, if a sample whose components are unknown is analyzed, since the mass number of ions to be cleaved cannot be specified, it is necessary to perform the $MS^n$ analysis by determining the mass number of the ions to be analyzed, after obtaining total spectral information on the sample, by measuring $MS^1$ spectral data for a predetermined range of mass number once only.

In such an analysis, the task of the user is heavy, and the analysis takes much time. Particularly, in the LC/MC system using the atmospheric ionization method, since the $MS^n$ analysis is almost indispensable for the substance-specification, it is desirable that the $MS^n$ analysis be smoothly or efficiently performed.

Moreover, the kinds of ionized components of a sample, which have been introduced into a mass spectrograph from a chromatograph, change moment by moment. Therefore, the kind of ionized component which is analyzed by the $MS^n$ analysis has already changed from that of the ionized component which should have been analyzed by the $MS^n$ analysis, in measurement processing in which the $MS^n$ analysis is performed after $MS^n$ spectral data for a predetermined range of mass number once only, which in turn causes erroneous results of the analysis. That is, it occurs that the analysis performed by the mass spectrograph cannot follow changes in the kinds of ionized components in the sample.

SUMMARY OF THE INVENTION

The present invention has been achieved in consideration of the above-described problems, and is aimed at providing a mass spectrometric analysis method, and an apparatus implementing the method, which is capable of accurately specifying substances included in a sample by using mass spectral data obtained by $MS^2$ analysis.

To achieve the above objective, the present invention provides a spectrometric analysis method and an apparatus implementing the method, in that a data base storing spectral data sets of respective standard substances, which are obtained by analyzing these standard substances in advance, each spectral data set including a name of a substance, its $MS^1$ spectral data and $MS^2$ spectral data, is constructed; and $MS^2$ spectral data sets obtained by $MS^2$ analysis of a sample are compared with $MS^2$ analysis spectral data sets stored in the data base.

DETAILED DESCRIPTION OF THE EMBODIMENTS

Hereafter, the embodiments according to the present invention will be explained in detail with reference to the drawings.

Figure 1:
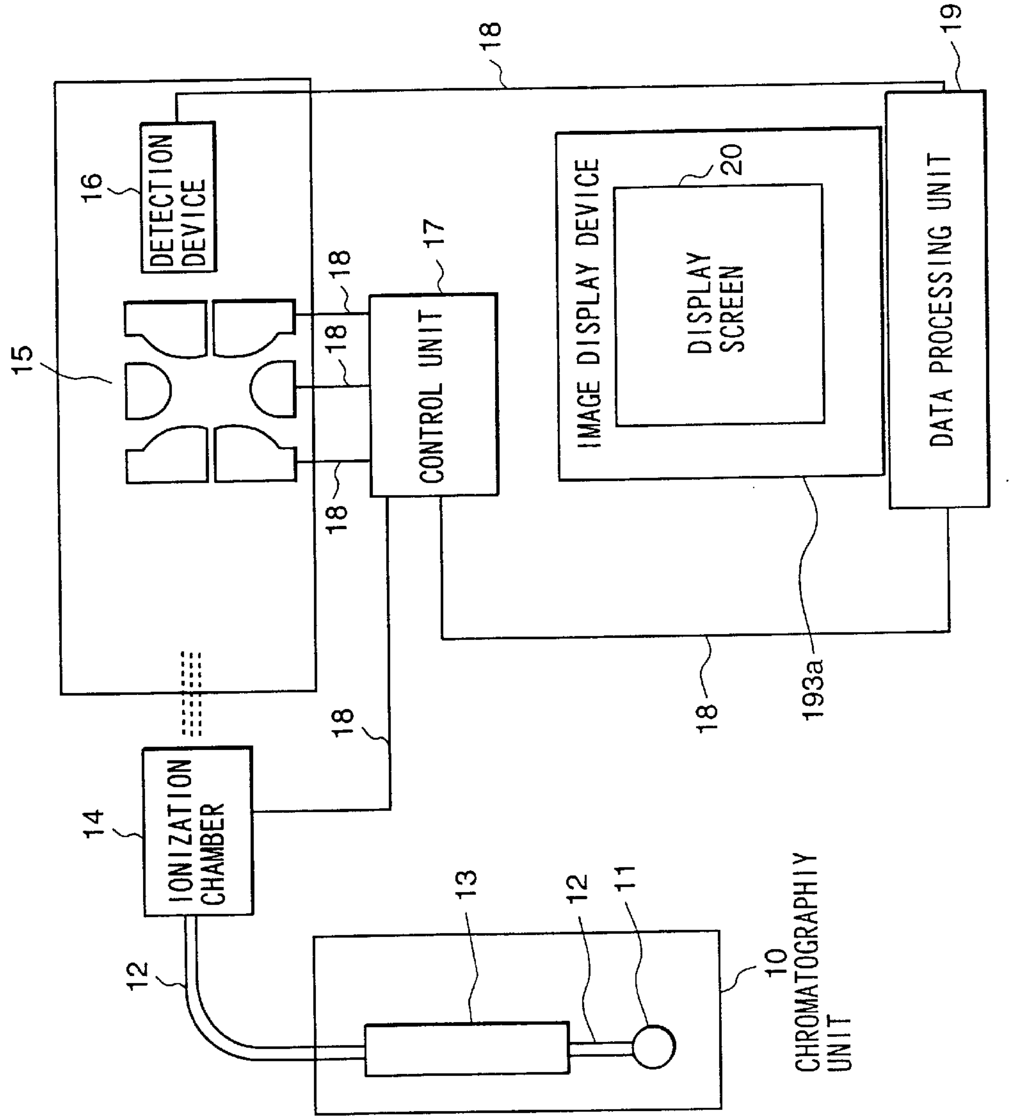
FIG. 1 is a schematic diagram of the composition of a mass spectrometric analysis apparatus of an embodiment according to the present invention.
Figure 2:
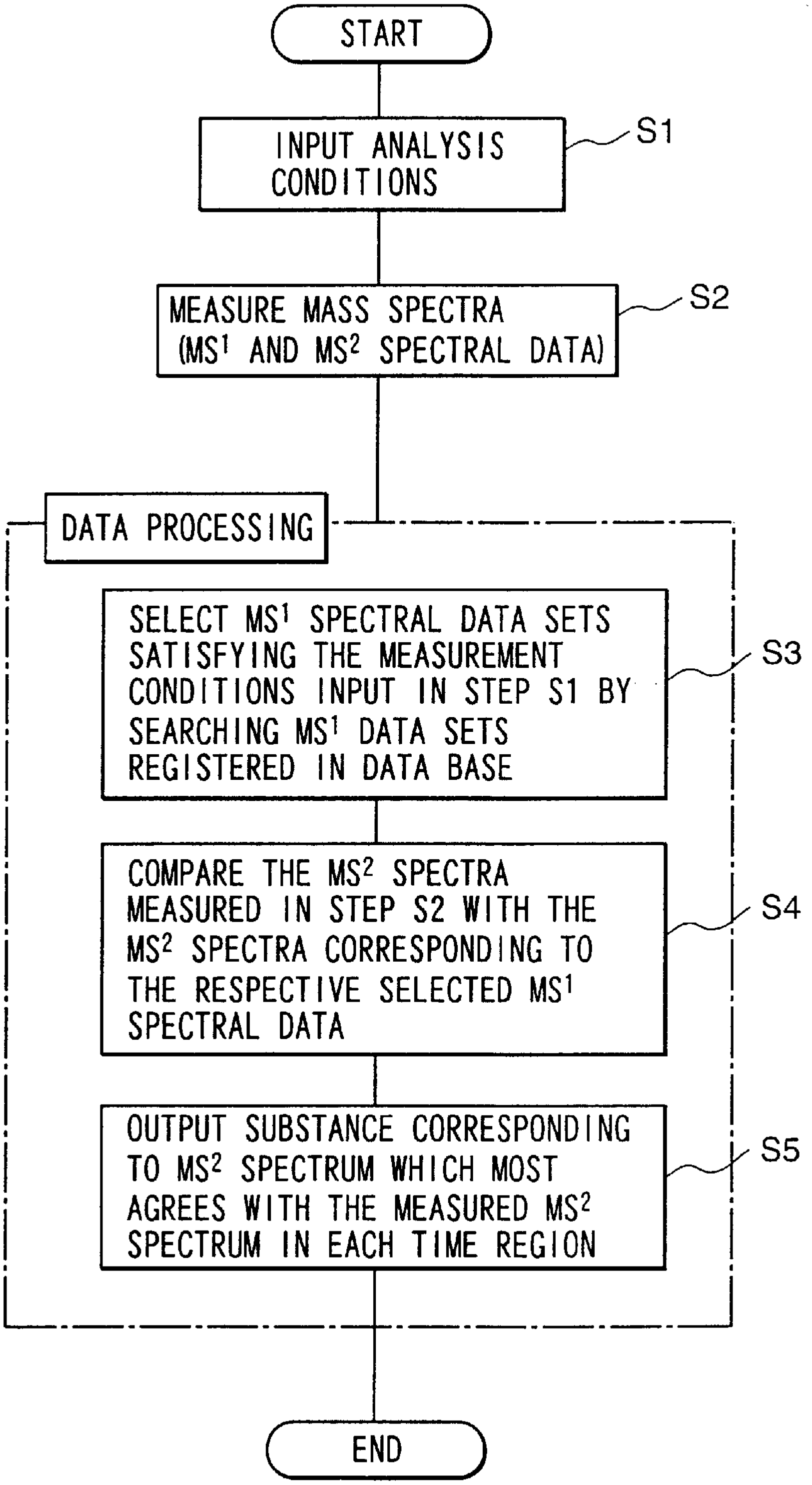
FIG. 2 is a flowchart of amass spectrometric analysis method of embodiment 1 according to the present invention.

In FIG. 1, the composition of a mass spectrometric analysis apparatus which is used in the embodiments according to the present invention is shown, and in FIG. 2, the detailed composition of the data processing unit is shown.

As shown in FIG. 1, the mass spectrometric analysis apparatus used in this embodiment, includes a chromatography unit 10 for separating components contained in a sample, an ionization chamber 14 for ionizing each separated component of the sample, a mass spectrometric analysis unit 15 for performing mass spectral analysis of ions which have been introduced from the ionization chamber 14, a detection device 16 for detecting ions which have passed through the analysis unit 15. The chromatography unit 10 includes a sample-introducing device 11 into which a sample is injected, an analysis column 13 for separating components contained in the sample, and a solvent-feed unit and a pump which are used (not shown in this figure) for feeding solvent which transfers the components of the sample. The sample-introducing device 11 and the analysis column 13, and the analysis column 13 and the ionization chamber 14, are connected to each other by respective pipes 12.

Further, the mass spectrometric analysis unit 15 of this embodiment includes a control unit 17 and a data processing unit 19. Signal wires 18 connect the mass spectrometric analysis unit 15 to the ionization chamber 14 and the control unit 17, the detection device 16 for detecting the density of ions of each mass number, to the data processing unit 19, and the control unit 17 to the data processing unit 19.

The data processing unit 19 receives mass spectral data detected by the detection device 16 via the signal wire 18, processes the received data, and display the results of the processing on a display screen 20. Further, the data processing unit 19 sends control signals of predetermined procedures to the control unit via the signal wire 18. Furthermore, the data processing unit 19 includes an input device (not shown in this figure) such as a keyboard used for an operator to input various setting information, and a pointing device (not shown in this figure) for moving a cursor on the display screen 20 in an image display device.

The control unit 17 controls the voltage applied to the mass spectrometric analysis unit 15 and so forth, in response to the control signals sent from the data processing unit 19.

The mass spectrometric analysis unit 15 of this embodiment uses an ion trap composed of a ring electrode and a pair of end cap electrodes. Further, the mass spectrometric analysis unit 15 generates a three-dimensional quadrupole electric field in a space surrounded by the ring electrode and the pair of end cap electrodes by applying high-frequency voltage to the ring electrode. The components of the sample, which have been ionized in the ionization chamber 14, are introduced into the above space in the spectrometric analysis unit 15, and are held in the generated three-dimensional quadrupole electric field once. Then, when $MS^1$ spectral data are obtained, ions are ejected to the detection device 16 in the order of increasing mass number by scanning the applied high-frequency voltage, and they are detected. The detected ion-density signal is sent to the data processing unit 19, and is recorded as a total ion chromatogram (TIC) which represents the change in time of the ion signal strength. Also, a mass spectral data of changes in the ion signal strength with respect to each mass to charge ratio (m/Z) is obtained and stored at each time step.

Further, when $MS^n$ spectral data are obtained, first, ions of a specified mass number are held in the ion trap in the mass spectrometric analysis unit 15, and ions of the other mass numbers are removed. This state can be easily implemented by applying high-frequency voltage, such as to cause the resonance state of the ions to be removed, to these ions. Next, CID (Collision Induced Dissociation) reactions are caused in the ions held in the ion trap by adding energy to these ions, which is implemented by applying the voltage of frequency equal to (or different from) the resonant frequency of motion of the ions. The ions cleaved by the CID reactions are ejected to the detection device 16 and detected. Thus, the $MS^n$ spectral data can also be obtained.

The mass spectrometric analysis for obtaining $MS^1$ spectral data and $MS^n$ spectral data spectral data can be performed by (1 s–3 s)/time. On the other hand, since the introduction of a sample from the chromatography unit 10 into the mass spectrometric analysis unit 15 is continued for about 10 minutes, this sample-introduction time is remarkably longer than the analysis time. Also, the sample introduced from the chromatography unit 10 into the mass spectrometric analysis unit 15 is separated into the respective components. Therefore, even if $MS^1$ spectral data and $MS^n$ spectral data are obtained in succession, as mentioned above, since the analysis time is sufficiently shorter than the sample-introduction time, the $MS^1$ spectral data and $MS^n$ spectral data of one component of the sample can be obtained within the introduction time of one component.

The present invention makes use of the feature of an ion trap, in which ions can be cleaved by controlling the electric field in the ion trap.

In the following, the embodiment 1 will be explained with reference to the drawings.

Embodiment 1:

This embodiment is an analysis which is effective for specifying components of a unknown sample. FIG. 2 shows a flow chart of the processing performed in this embodiment.

Figure 5A:
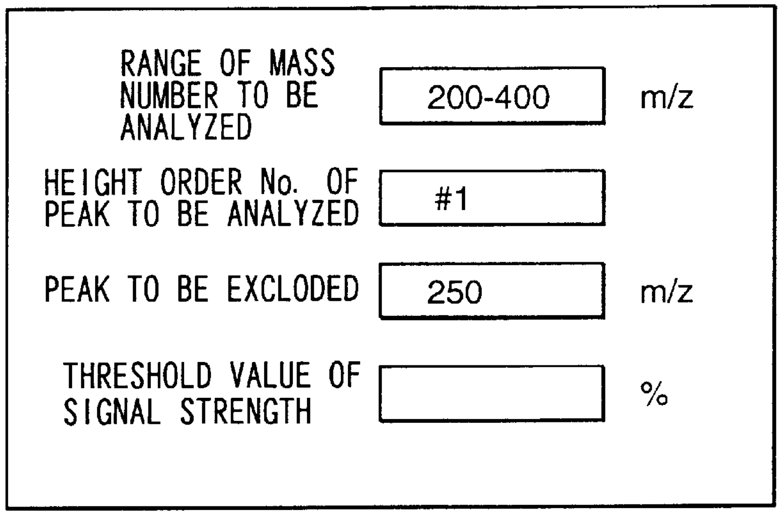
FIG. 5A is an example of a condition-setting picture used in embodiment 1.

First, in step S1, a measurement condition-setting picture such as that shown in FIG. 5A is displayed on the display screen 20, and a user inputs each measurement condition. The main measurement conditions are "RANGE OF MASS NUMBER TO BE ANALYZED" and "HEIGHT-ORDER NUMBER OF PEAK TO BE ANALYZED". The conditions of "PEAK TO BE EXCLUDED" and "THRESHOLD VALUE TO SIGNAL STRENGTH" are prepared to improve mass analysis, and it is possible that these conditions are not always set. Meanwhile, although mass number should be correctly described as mass to charge ratio (m/Z), this ratio m/Z is described as mass number in this specification for simplicity.

A range of mass number of ions whose $MS^2$ spectral data are obtained is set to "RANGE OF MASS NUMBER TO BE ANALYZED". In this case, the range of mass number "200–400" is set. Further, it is set to "HEIGHT-ORDER NUMBER OF PEAK TO BE ANALYZED" what peaks in the peaks of the $MS^1$ spectrum measured in the range of 200–400 which is set in "RANGE OF MASS NUMBER TO BE ANALYZED", is analyzed for $MS^2$ analysis. In this case, #1 is input to this condition, and this means that ions corresponding to the highest peak in the measured $MS^1$ spectrum are analyzed for $MS^2$ analysis. In "PEAK TO BE EXCLUDED", a peak which should not be analyzed for $MS^2$ analysis is designated. In this case, since the value of 250 (m/Z) is input, even if a peak of this mass number is detected in the measured $MS^1$ spectrum, ions corresponding to this peak are not analyzed for $MS^2$ analysis. Sometimes, a substance such as Teflon which is used for the pipe 12, is mixed in a sample, and is detected as an impurity substance. The providing of the condition "PEAK TO BE EXCLUDED" is effective for preventing detection of such an impurity substance. The condition "THRESHOLD VALUE TO SIGNAL STRENGTH" is provided to designate the minimum signal strength of candidate peaks to be analyzed for $MS^2$ analysis. By providing this condition, peaks of noise level can be excluded from object peaks to be analyzed for $MS^2$ analysis.

Figure 6A:
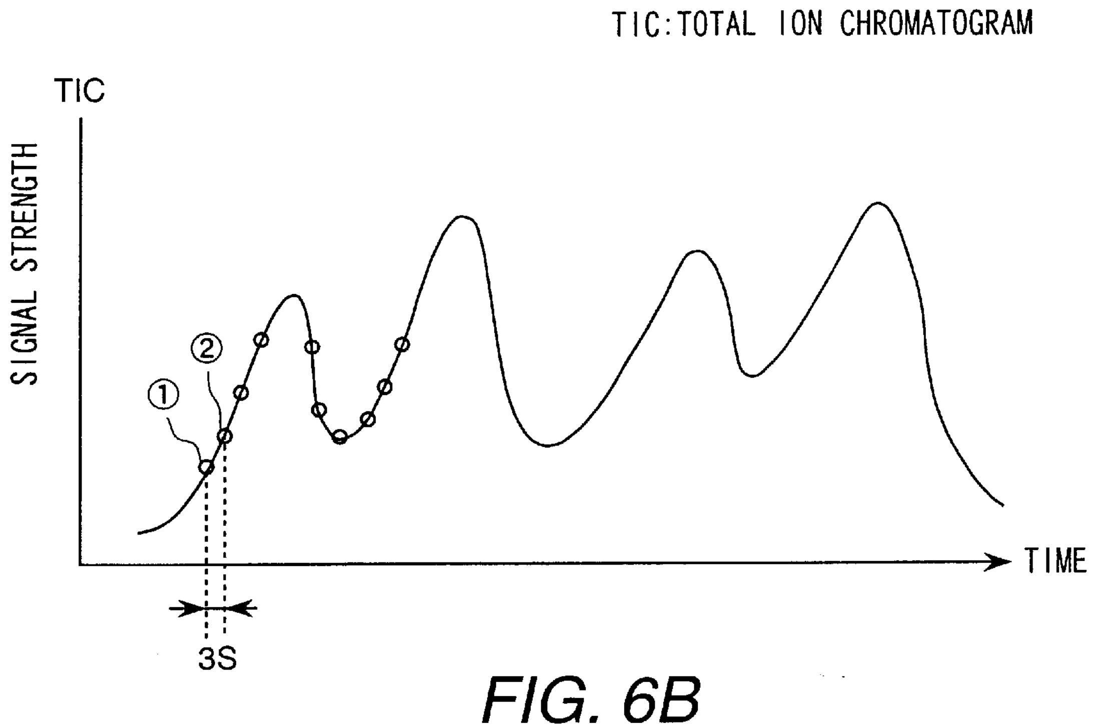
FIGS. 6A, 6B, and 6C are figures conceptually illustrating the analysis processing performed in embodiment 1.
Figure 6B:
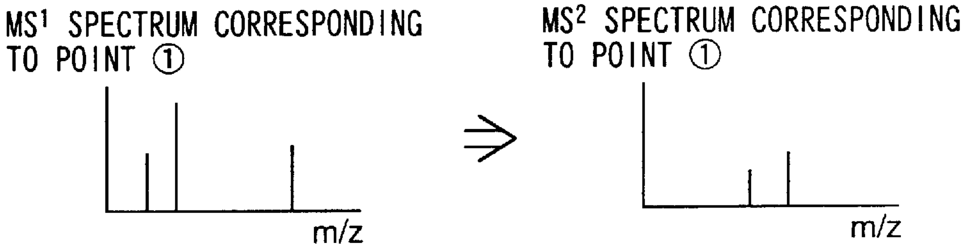
Figure 6C:
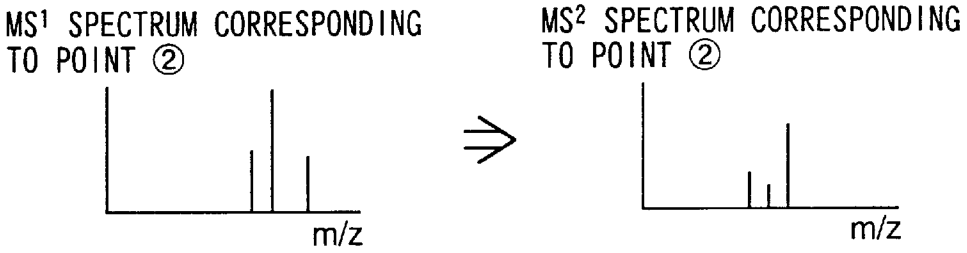

Next, the analysis of the sample starts. The sample injected from the sample-introducing device 11 is separated into each component substance (referred to simply as component or substance) by the analysis column 13, and each separated component is sent to the ionization chamber 14. Further, the mass spectrometry of the component ionized in the ionization chamber 14 is performed by the mass spectrometric analysis unit 15, and the ionized component is detected by the detection device 16. In this embodiment, in step S2, while $MS^1$ analysis and $MS^2$ analysis are alternately performed, the mass spectrometry is continued until the introduction of the sample from the chromatography unit 10 is completed. Here, the analysis is performed for only a group of ions, which satisfies the analysis conditions set in step S1. FIGS. 6A, 6B, and 6C conceptually illustrate the processing executed in step 2. Also, FIG. 6A shows a total ion chromatograph (TIC) obtained in the $MS^1$ analysis. The $MS^1$ analysis is performed at each measurement point by a predetermined period (3*s* in this example). As shown in FIG. 6B and FIG. 6C, the $MS^2$ analysis of the designated peak in the $MS^1$ spectrum obtained at each measurement point is performed within each period between two measurement points.

All the obtained $MS^1$ and $MS^2$ spectral data are stored in a memory situated in the data processing unit 19.

Next, in step S3, spectral data sets of substances, which satisfy the analysis conditions set in step S1, are selected by searching $MS^1$ spectral data sets in a data base stored in the data processing unit 19.

Figure 4:
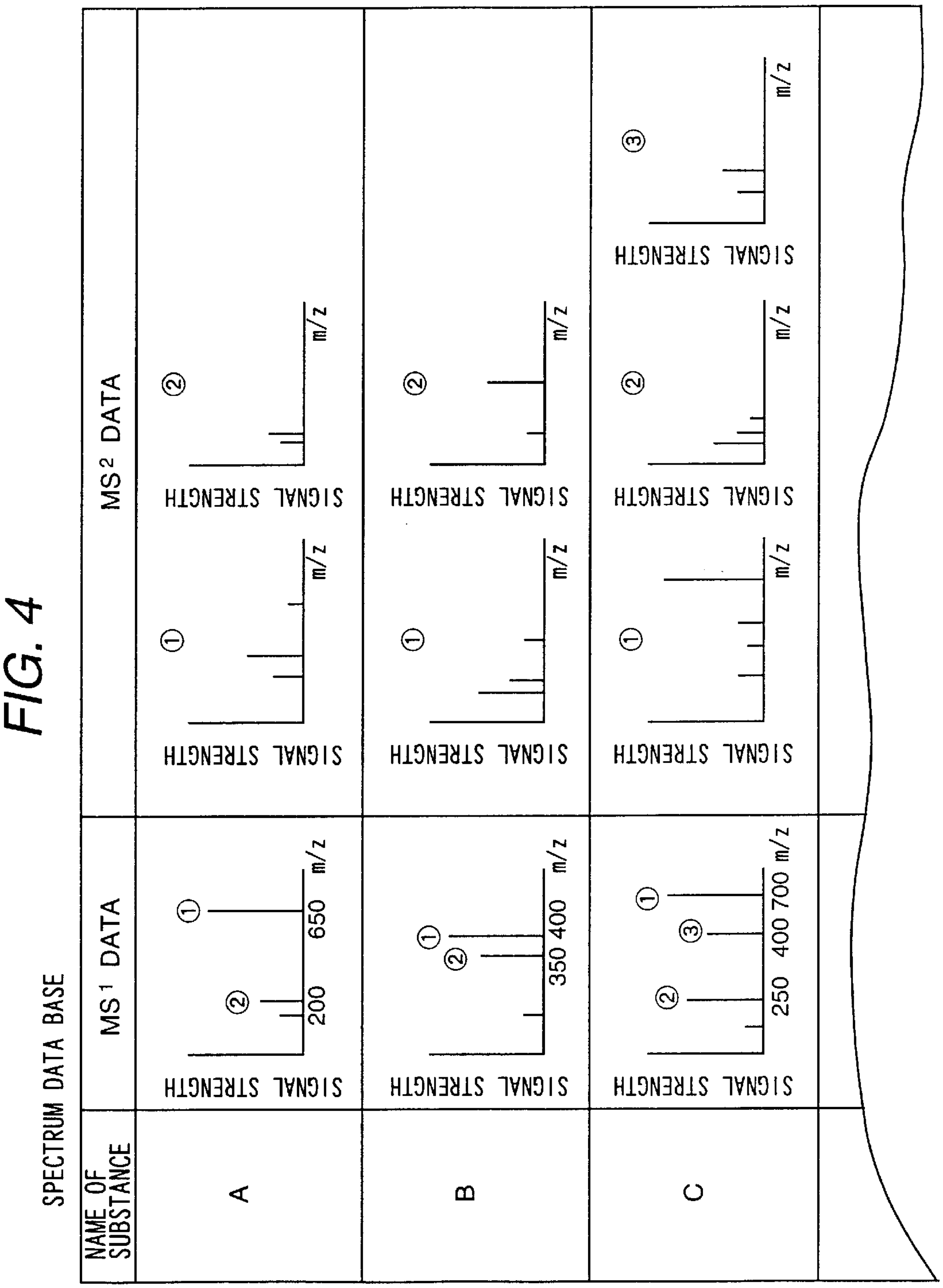
FIG. 4 is an example of contents of a data base.

Here, the above data base is conceptually illustrated in FIG. 4. In this data base, spectral data sets of respective standard substances, which are obtained by analyzing these standard substances, are stored in advance. Further, each spectral data set includes a substance name, its $MS^1$ spectral data, and $MS^2$ spectral data obtained by performing analysis for ions corresponding to characteristic peaks in the $MS^1$ spectrum. For example, the spectral data set of substance A in FIG. 4 includes $MS^1$ spectrum having peaks ① and ② at 200 m/Z and 650 m/Z, and two $MS^2$ spectra obtained by performing analysis for ions corresponding to the peaks ① and ②.

The processing executed in step 3 is explained below for the case wherein the analysis conditions is shown in FIG. 5A. Since object peaks are the highest peak in the $MS^1$ spectrum of each substance whose mass number is within the range of 200–400 m/Z (however, the peak at 250 m/Z is excluded), peak ② in the spectrum of substance A, peak ① in the spectrum of substance B, and peak ③ in the spectrum of substance C, are selected as the object peaks.

Next, in step S4, each $MS^2$ spectrum obtained by the $MS^2$ analysis performed in step S2 is compared with the respective $MS^2$ spectral data selected from the data base. That is, each $MS^2$ measured spectrum is compared with the respective $MS^2$ spectra corresponding to peak ② in the spectrum of substance A, peak ① in the spectrum of substance B, and peak ③ in the spectrum of substance C, in turn. Since there are a plurality of components in the sample, plural types of $MS^1$ spectra are obtained over the whole retention time of the TIC output from the chromatography unit 10. Each type of $MS^1$ spectrum basically corresponds to a component of a peak in the TIC. Therefore, each of the $MS^2$ spectra with regard to the measured plural types of $MS^1$ spectra is compared with the respective $MS^2$ spectra selected from the data base.

Figure 7:
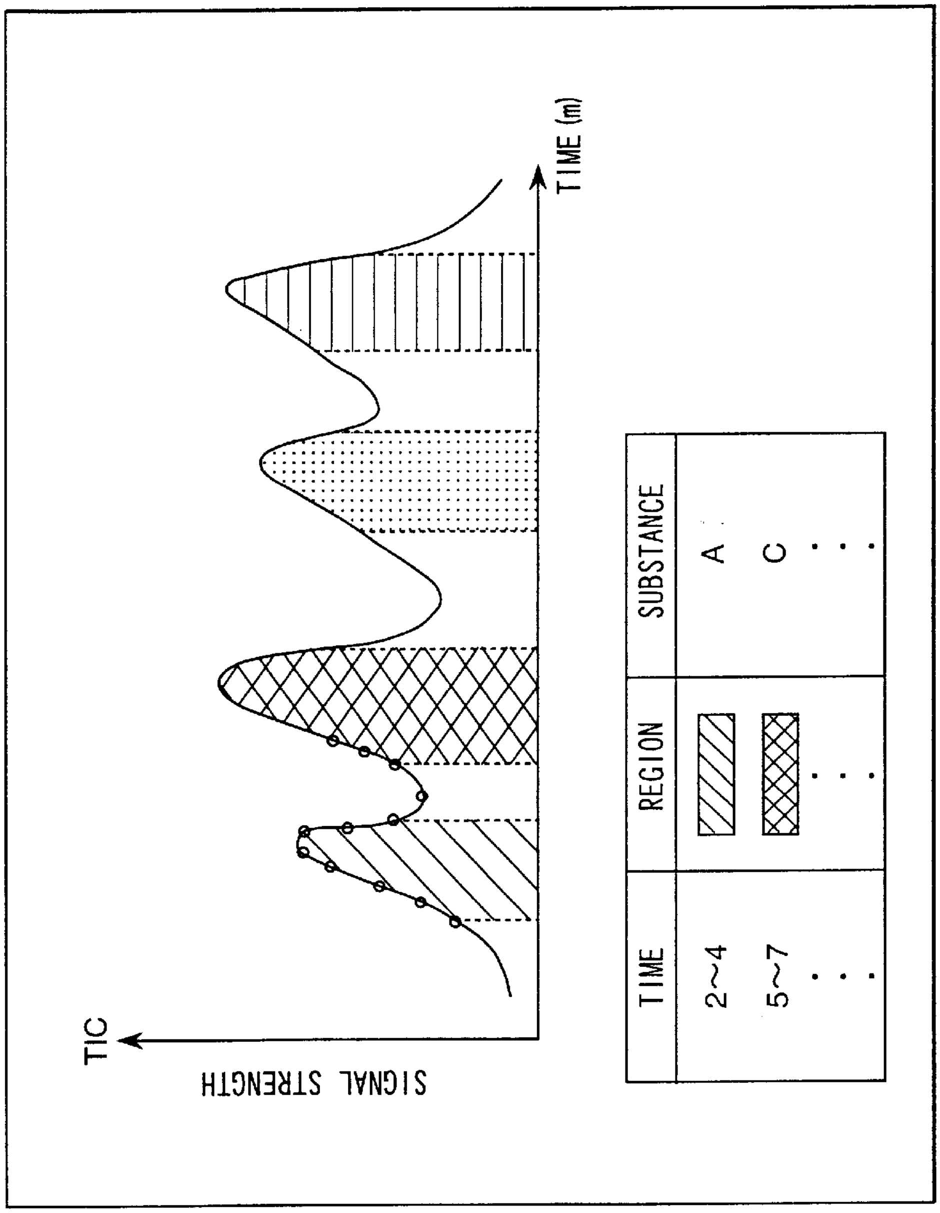
FIG. 7 is an example of a picture displaying results of the analysis performed in embodiment 1.

Last, in step S5, the name of the substance whose $MS^2$ spectrum most agrees with the $MS^2$ spectrum obtained in each time region (spanning each peak in the TIC), is displayed on the display screen 20 as the component of the sample, which corresponds to the time region in the TIC. FIG. 7 shows an example of the above display.

According to this embodiment, components of a sample can be promptly specified by using $MS^2$ spectral data. Therefore, even if no more than very simple mass spectrum, which is obtained by $MS^1$ analysis such as that performed in a LC/MC system using the atmospheric ionization method, can be obtained, components of a sample can still be promptly and accurately specified.

Further, by designating the range of mass number of peaks in $MS^1$ spectrum, to be analyzed for $MS^2$ analysis, candidates of substances to be analyzed, which are stored in a data base, can be narrowed down.

In the following, the embodiment 2 will be explained with reference to the drawings.

Embodiment 2

This embodiment is effective for the case wherein the name of a component to be analyzed, in a sample, is designated in advance.

Figure 3:
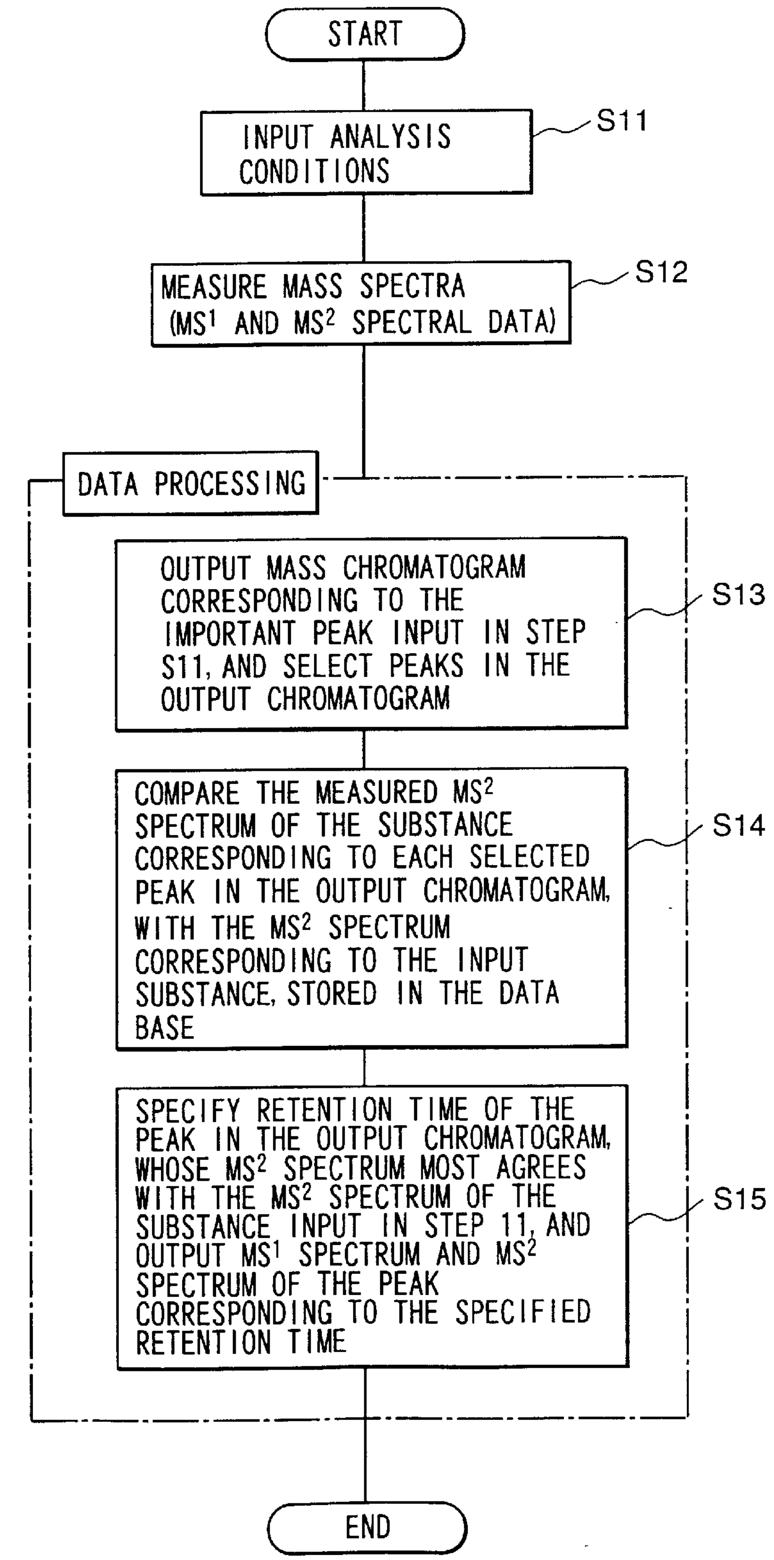
FIG. 3 is a flow chart of a mass spectrometric analysis method of embodiment 2 according to the present invention.

FIG. 3 shows a flow chart of the processing performed in this embodiment.

Figure 5B:
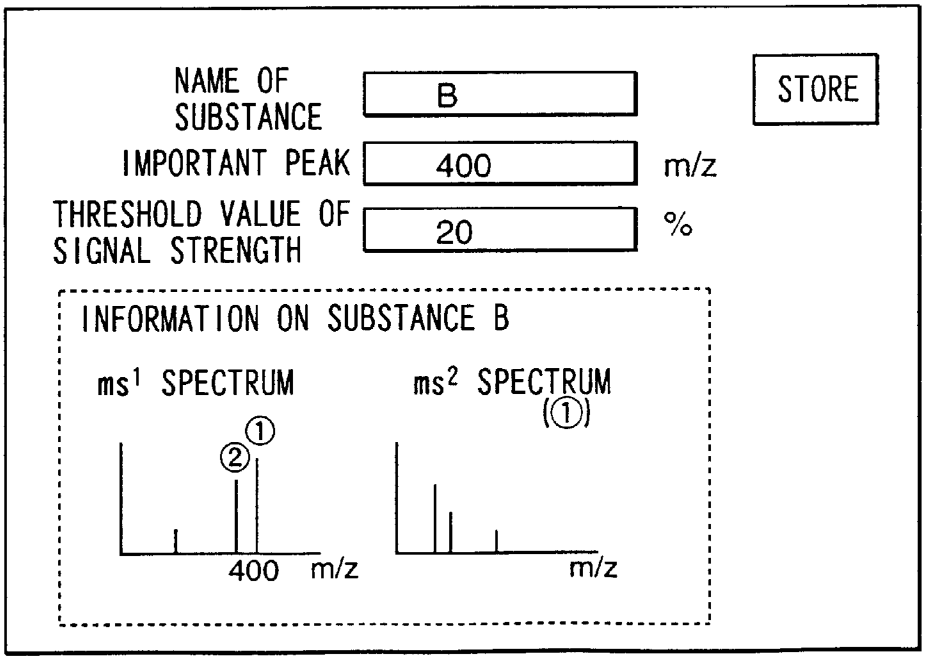
FIG. 5B is an example of a condition-setting picture used in embodiment 2.

First, in step S11, a measurement condition-setting picture such as that shown in FIG. 5B is displayed on the display screen 20, and a user inputs each measurement condition. The main measurement conditions to be input in this example are "NAME OF SUBSTANCE" and "IMPORTANT PEAK". Further, in this example also, the condition "THRESHOLD VALUE TO SIGNAL STRENGTH" is prepared to improve mass analysis, and it is possible that this condition is not always set.

To "NAME OF SUBSTANCE", the name of a substance whose presence in a sample is to be confirmed, is set. In this case, the name of substance B is set. Also, the mass number (m/Z) of the characteristic peak, which must appear in the mass spectrum of the substance B, is set to "IMPORTANT PEAK". In this case, the value of 400 (m/Z) is set. Further, the value of 20% is set to "THRESHOLD VALUE TO SIGNAL STRENGTH".

When the input data are set to "NAME OF SUBSTANCE" and "IMPORTANT PEAK", spectral information on the set substance is displayed in the region under the region for "THRESHOLD VALUE TO SIGNAL STRENGTH" on the display screen 20 as shown in FIG. 5B. In this case, since the name of substance B and the mass number 400 of the important peak are set, $MS^1$ spectral data and $MS^2$ spectral data with regard to the important peak are displayed. After the condition-input to the picture on the display screen 20 is completed, the user moves the cursor to the button "STORE", and clicks it. Then the condition-setting is complete.

Next, the analysis of the sample starts. In this embodiment also, in step S12, while $MS^1$ analysis and $MS^2$ analysis are alternately performed, the mass spectrometry is continued until the introduction of the sample from the chromatography unit 10 is completed. Here, the $MS^2$ analysis is performed for ions corresponding to the important peak set in step S11. In this case, the $MS^2$ analysis is performed for the peak of 400 m/Z which is set in the picture shown in FIG. 5B.

All the obtained $MS^1$ and $MS^2$ spectral data are stored in a memory situated in the data processing unit 19.

Further, in step S13, amass chromatogram corresponding to the important peak set in step S11 is obtained. In this case, this mass chromatogram corresponds to the TIC used for the $MS^2$ analysis of the peak at 400 m/Z. Also, a mass chromatogram obtained by extracting only the chromatogram component corresponding to the mass number 400 m/Z, in the $MS^1$ analysis of the sample, can also be used as the above mass chromatogram corresponding to the important peak to be obtained in step 13.

Furthermore, in step 14, the $MS^2$ spectrum obtained by the $MS^2$ analysis of each peak in the mass chromatogram corresponding to the important peak is compared with the spectrum of the substance set in step S11, which has been selected from the data base, shown in FIG. 4.

Figure 8A:
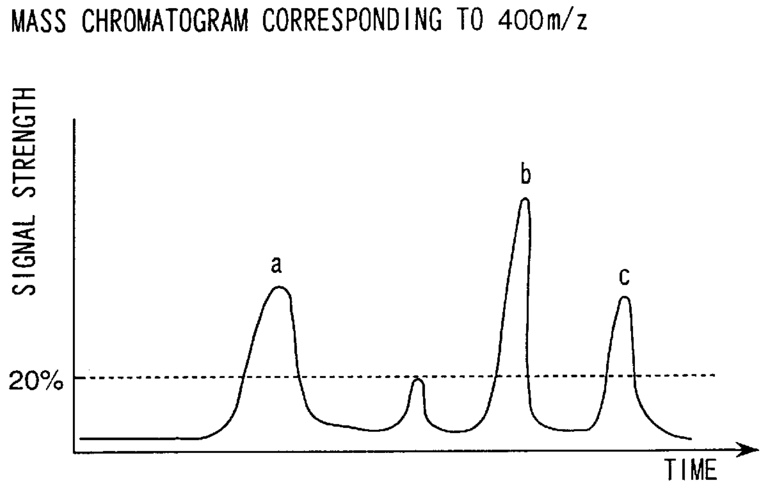
FIGS. 8A and 8B are figures conceptually illustrating the analysis processing performed in embodiment 2.
Figure 8B:
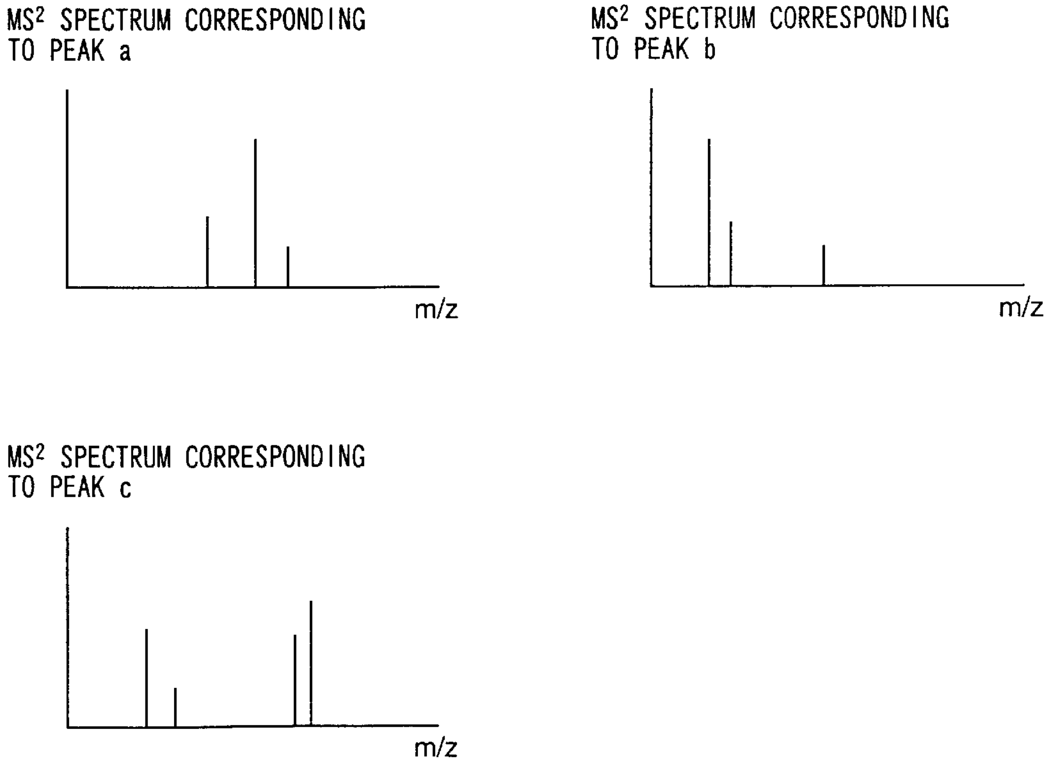

Here, examples of; the mass chromatogram corresponding to the important peak, and the $MS^2$ spectra obtained by the $MS^2$ analysis of the respective peaks; are shown in FIG. 8A and FIG. 8B, respectively. In FIG. 8A, the mass chromatogram corresponding to the peak of 400 m/Z is shown. This figure also indicates that three peaks a, b, and c, whose heights are greater than the set threshold value of signal strength of 20%, are discriminated. In FIG 8B, the $MS^2$ spectra obtained by the $MS^2$ analysis of the peaks a, b, and c, are shown, respectively. In step 14, each of the $MS^2$ spectra shown in FIG. 8B is compared with the $MS^2$ spectrum ① of substance B selected from the data base shown in FIG. 4.

Lastly, in step 15, the retention time of the peak in the mass chromatogram, whose spectrum most agrees with the spectrum of substance B in the data base, is specified, and the $MS^1$ spectrum and $MS^2$ spectrum of the component at the specified retention time are shown on the display screen 20. Thus, the whole processing ends.

Figure 9:
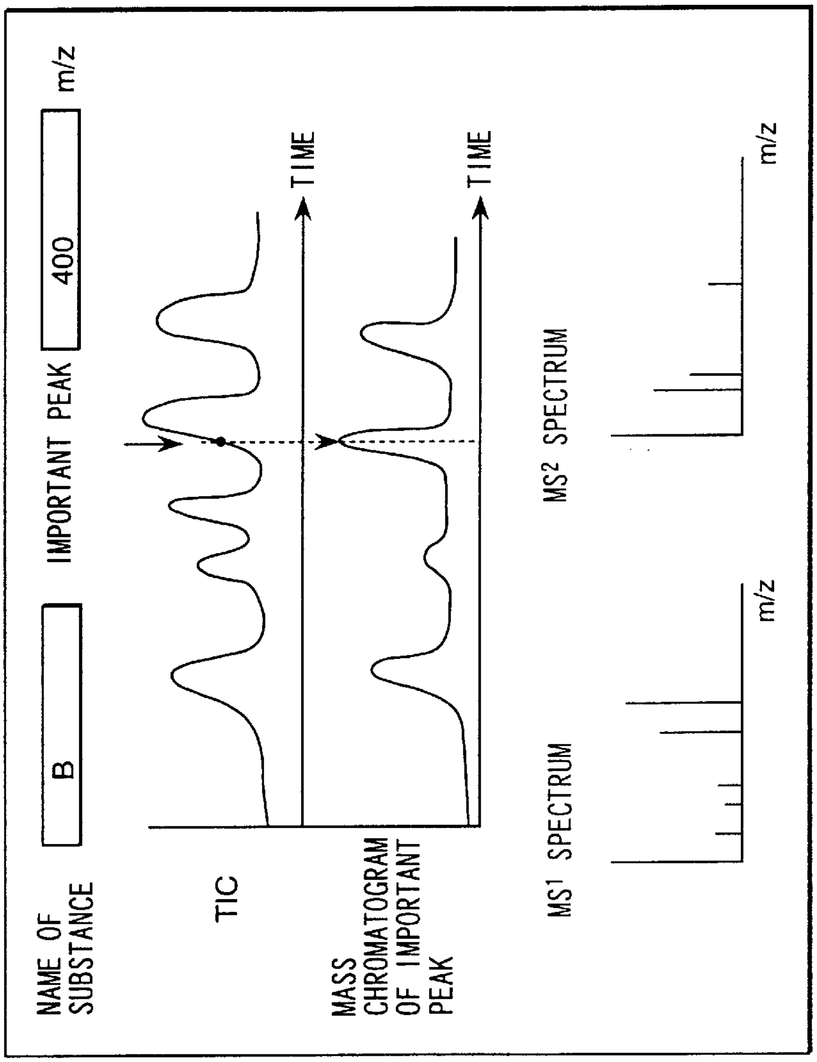
FIG. 9 is an example of a picture displaying results of the analysis performed in embodiment 2.

An example of the displayed picture of the results is shown in FIG. 9. As shown in FIG. 9, items displayed in this picture are "NAME OF SUBSTANCE" and "IMPORTANT PEAK" set in step S11, the TIC for all mass number, the mass chromatogram of the set important peak, and the $MS^1$ spectrum and $MS^2$ spectrum of the component at the specified retention time. The arrows shown in the TIC for all mass number, the mass chromatogram of the set important peak indicate the specified retention time.

In this embodiment, since an object substance to be analyzed is predetermined, by performing $MS^2$ analysis for only an important peak, which is designated in peaks in the $MS^1$ spectrum of a sample, and comparing each of the $M^2$ spectra obtained by the analysis with the $MS^2$ spectrum of the object substance, it is possible to confirm the retention time of the object substance included in the sample quickly and accurately.

In the above two embodiments, spectral data obtained by $MS^1$ and $MS^2$ analyses are used to specify components in a sample. However, spectral data obtained by $MS^n$ analysis (n=3, 4, . . . ) can also be used. As n increases, although the amount of spectral data stored in the data base greatly increases, which in turn will increase the memory size in the data processing unit 19, and cause deterioration of processing speed of the unit 19, the accuracy of analysis can be improved.

As described above, one main feature of the present invention is that a set of $MS^2$ spectra according to respective key peaks in $MS^1$ spectrum of each standard substance is prepared in a data base. By preparing such a data base and performing the analysis methods described in the above embodiments, even a mass analysis apparatus, such as an LC/MC system using the atmospheric ionization method, in which spectral information obtained from mass spectral data measured by $MS^1$ analysis is poor, can specify components in a sample promptly and accurately. Thus, the accuracy of specifying components in a sample can be increased. Also, in the case wherein it is confirmed that a specified substance is included in a sample, the presence of this substance in the sample can be efficiently determined.

Moreover, in accordance with the present invention, since $MS^2$ spectral data can be accumulated in a single $MS^1$ analysis, the sample analysis can easily follow changes in components of a sample, which has been introduced from a chromatograph, and a real-time analysis has become possible. Further, since it is not necessary to perform re-analysis for $MS^2$ analysis, the analysis according to the present invention is very effective for analyzing a valuable sample.

What is claimed is:

1. A mass spectrometric analysis method having a standard data base storing $MS^1$ mass spectrometric data for an $MS^1$ analysis and $MS^2$ mass spectrometric data for an $MS^2$ analysis and performing said $MS^1$ analysis and $MS^2$ analysis by using an ion trap capable of trapping ionized components of a sample, which have been introduced into a mass spectrometric analysis unit, said method comprising the steps of:

setting analysis conditions for performing said $MS^2$ analysis;

obtaining mass spectra for said $MS^1$ analysis and said $MS^2$ analysis while alternately performing said $MS^1$ analysis and $MS^2$ analysis for said ionized components which satisfy said analysis condition set;

selecting said $MS^1$ mass spectrometric data and said $MS^2$ mass spectrometric data satisfying said set analysis conditions from said standard data base; and comparing said mass spectrum obtained by said $MS^2$ analysis with said selected $MS^2$ mass spectrometric data for $MS^2$ analysis from said standard data base.

2. A mass spectrometric analysis method according to claim 1, wherein a range of mass number to charge ratio, in which $MS^2$ analysis is performed, and the position of at least one characteristic peak in respective spectral data sets to be obtained, at which ionized components of said sample are analyzed for $MS^2$ analysis, are set to said analysis conditions.

3. A mass spectrometric analysis method according to claim 1, wherein the position of an excluded peak in respective spectral data sets at which ionized components of said sample are not analyzed for $MS^2$ analysis, and a threshold value of signal strength, only ions of signal strength higher than said threshold value being analyzed for $MS^2$ analysis, are set to said analysis conditions.

4. Amass spectrometric analysis method according to claim 1, wherein said comparison is performed for all the obtained spectral data sets, and the substance whose spectrum most agrees with one of said obtained spectral data sets is output as a result of said comparison.

5. A mass spectrometric analysis method having a standard data base storing $MS^1$ mass spectrometric data for $MS^1$ analysis and $MS^2$ mass spectrometric data for $MS^2$ analysis and performing said $MS^1$ analysis and $MS^2$ analysis by using an ion trap capable of trapping ionized components of a sample, which has been introduced into a mass spectrometric analysis unit, said method comprising the steps of:

setting a mass number to charge ratio (m/z);

obtaining mass spectra for said mass number to charge ratio while alternately performing said $MS^1$ analysis and $MS^2$ analysis; and judging a peak of said mass spectrum of said set mass number to charge ratio (m/z) and comparing said mass spectrum at said peak obtained by said $MS^2$ analysis with said selected $MS^2$ mass spectrometric data for $MS^2$ analysis from said standard data base corresponding to said ionized component being said peak of said set mass number to charge ratio (m/z).

6. A mass spectrometric analysis method according to claim 5, wherein a name of a substance is et along with said mass to charge ratio, and respective said mass spectrum sets corresponding to said selected peaks in said mass chromatogram are compared with a $MS^2$ mass spectrometric data set of said set name of said substance in said data base.

7. A mass spectrometric analysis method according to claim 6, wherein a retention time at which ions of a component in said sample, equal to said set substance, are detected in said chromatogram, is displayed as a result of said comparison.

8. A mass spectrometric analysis apparatus including an ion chamber for ionizing components of a sample, which have been introduced, a mass spectrometric analysis unit for trapping and cleaving said ionized component, and performing mass spectrometric analysis of said ionized component, a detection device for detecting ionized components which have been ejected from said mass spectrometric analysis unit, a data processing unit for processing information sent from said detection device, an input device for inputting analysis conditions set by a user, and a display device for display results of said data processing, said apparatus comprising:

a standard data base storing $MS^1$ mass spectrometric data for $MS^1$ analysis and $MS^2$ mass spectrometric data for $MS^2$ analysis corresponding to ionized components;

wherein said display device displays said analysis conditions for said $MS^2$ analysis inputted from said input device mass spectrum sets of said introduced components of said sample are obtained while alternately performing $MS^1$ analysis and $MS^2$ analysis, and $MS^2$ spectral data sets obtained by said $MS^2$ analysis based on said condition inputted from said input device are compared with $MS^2$ analysis spectrometric data sets in said data base.

9. A mass spectrometric analysis apparatus according to claim 8, wherein a picture for setting a range of mass number to charge ratio, in which $MS^2$ analysis is performed, and the position of at least one characteristic peak in spectral data, at which ionized components of said sample are analyzed for $MS^2$ analysis, is displayed on said display device.

10. A mass spectrometric analysis apparatus according to claim 9, wherein said data processing analysis creates a mass chromatogram of ions at said peak at said ratio (m/Z) by using said results of mass spectrometric analysis for said sample, and displays said created mass chromatogram.

11. A mass spectrometric analysis apparatus according to claim 9, wherein regions for setting the position of an excluded peak in spectral data at which ionized components of said sample are not analyzed for $MS^2$ analysis, and a threshold value of signal strength, only ions of signal strength higher than said threshold value being analyzed $MS^2$ analysis, are displayed in said picture.

12. A mass spectrometric analysis apparatus according to claim 8, wherein a picture for setting a name of a substance to be analyzed, and a mass number to charge ratio (m/Z), a peak at said ratio being an important peak of analysis, is displayed on said display device.

* * * * *

UNITED STATES PATENT AND TRADEMARK OFFICE

CERTIFICATE OF CORRECTION

PATENT NO. : 6,573,492 B2
DATED : June 3, 2003
INVENTOR(S) : Nagai

It is certified that error appears in the above-identified patent and that said Letters Patent is hereby corrected as shown below:

Column 3,
Lines 15-27, please replace the second full paragraph as follows:

-- Moreover, the kinds of ionized components of a sample, which have been introduced into a mass spectrograph from a chromatograph, change moment by moment. Therefore, the kind of ionized component which is analyzed by the $MS^n$ analysis has already changed from that of the ionized component which should have been analyzed by the $MS^n$ analysis, in measurement processing in which the $MS^n$ analysis is performed after ~~$MS^n$~~ MS' spectral data for a predetermined range of mass number once only, which in turn causes erroneous results of the analysis. That is, it occurs that the analysis performed by the mass spectrograph cannot follow changes in the kinds of ionized components in the sample. --

Column 8,
Lines 55-62, please replace paragraph 8 as follows:

-- In this embodiment, since an object substance to be analyzed is predetermined, by performing $MS^2$ analysis for only an important peak, which is designated in peaks in the $MS^1$ spectrum of a sample, and comparing each of the ~~$M^2$~~ $MS^2$ spectra obtained by the analysis with the $MS^2$ spectrum of the object substance, it is possible to confirm the retention time of the object substance included in the sample quickly and accurately. --

Signed and Sealed this

Eleventh Day of May, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,573,492 B2
APPLICATION NO. : 09/748330
DATED : June 3, 2003
INVENTOR(S) : Nagai It is certified that error appears in the above-identified patent and that said Letters Patent is hereby corrected as shown below:

Column 3,
Lines 15-27, please replace the second full paragraph as follows:

-- Moreover, the kinds of ionized components of a sample, which have been introduced into a mass spectrograph from a chromatograph, change moment by moment. Therefore, the kind of ionized component which is analyzed by the $MS^{\eta}$ analysis has already changed from that of the ionized component which should have been analyzed by the $MS^{\eta}$ analysis, in measurement processing in which the $MS^{\eta}$ analysis is performed after $MS^1$ sepctral data for a predetermined range of mass number once only, which in turn causes erroneous results of the analysis. That is, it occurs that the analysis performed by the mass spectrograph cannot follow changes in the kinds of ionized components in the sample. --

Column 8,
Lines 55-62, please replace paragraph 8 as follows:

-- In this embodiment, since an object substance to be analyzed is predetermined, by performing $MS^2$ analysis for only an important peak, which is designated in peaks in the $MS^1$ spectrum of a sample, and comparing each of the $MS^2$ spectra obtained by the analysis with the $MS^2$ spectrum of the object substance, it is possible to confirm the retention time of the object substance included in the sample quickly and accurately. --

This certificate supersedes Certificate of Correction issued May 11, 2004.

Signed and Sealed this

Sixth Day of February, 2007

JON W. DUDAS
*Director of the United States Patent and Trademark Office*